United States Patent
Lee

(10) Patent No.: US 10,480,625 B2
(45) Date of Patent: Nov. 19, 2019

(54) EMERGENCY STEERING SYSTEM FOR VEHICLE

(71) Applicants: Hyundai Motor Company, Seoul (KR); Kia Motors Corporation, Seoul (KR)

(72) Inventor: Chi Woo Lee, Whasung-Si (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 8 days.

(21) Appl. No.: 15/686,346

(22) Filed: Aug. 25, 2017

(65) Prior Publication Data

US 2017/0356544 A1  Dec. 14, 2017

(30) Foreign Application Priority Data

Jun. 12, 2016  (KR) ................. 10-2016-0164821

(51) Int. Cl.
| F16H 3/66 | (2006.01) |
| B62D 1/10 | (2006.01) |
| B62D 3/02 | (2006.01) |
| B62D 5/04 | (2006.01) |
| B62D 1/16 | (2006.01) |
| B62D 5/30 | (2006.01) |
| B62D 5/00 | (2006.01) |

(52) U.S. Cl.
CPC .............. *F16H 3/666* (2013.01); *B62D 1/10* (2013.01); *B62D 1/166* (2013.01); *B62D 3/02* (2013.01); *B62D 5/0403* (2013.01); *B62D 5/30* (2013.01); *B60Y 2306/13* (2013.01); *B60Y 2400/83* (2013.01); *B62D 5/008* (2013.01); *F16H 2200/2005* (2013.01); *F16H 2200/2007* (2013.01)

(58) Field of Classification Search
CPC .. B62D 5/30; B62D 1/166; F16H 3/08; F16H 2003/007
See application file for complete search history.

(56) References Cited

U.S. PATENT DOCUMENTS

| 2,968,189 | A  * | 1/1961  | Walko ................. B62D 5/30 180/440 |
| 6,896,090 | B2 * | 5/2005  | Kanda ................ B62D 5/008 180/402 |
| 7,726,439 | B2 * | 6/2010  | Akuta ................. B62D 3/12 180/402 |
| 9,862,405 | B2 * | 1/2018  | Park ................... B62D 5/008 |
| 2004/0251061 | A1 * | 12/2004 | Augustine ........... B62D 5/008 180/6.2 |
| 2012/0261208 | A1 * | 10/2012 | Rothhamel .......... B62D 5/008 180/443 |
| 2016/0200349 | A1 * | 7/2016  | Whitaker, Jr. ....... B62D 5/062 180/421 |

* cited by examiner

*Primary Examiner* — Jacob S. Scott
*Assistant Examiner* — James J Taylor, II
(74) *Attorney, Agent, or Firm* — Morgan, Lewis & Bockius LLP

(57) ABSTRACT

An emergency steering system for a vehicle, may include a planetary gear mounted in an inlet space of a gear box for a steering apparatus so that the planetary gear is ordinarily operated at a gear ratio of 1:1 and has an increased gear ratio in the event of failure of a main steering device; and a gear ratio increasing device mounted to an upper plate portion of the gear box to increase the gear ratio of the planetary gear.

6 Claims, 6 Drawing Sheets

◯ : PUSHER CONTACT PORTION

GEAR RATIO [ 1 : 1 ]

GEAR RATIO [ 1.8 : 1 ]

EMERGENCY STEERING SYSTEM FOR VEHICLE

CROSS-REFERENCE TO RELATED APPLICATION

The present application claims priority to Korean Patent Application No. 10-2016-0164821 filed on Dec. 6, 2016, the entire contents of which are incorporated herein for all purposes by this reference.

BACKGROUND OF THE INVENTION

Field of the Invention

The present invention relates to an emergency steering system for a vehicle, and more particularly, to an emergency steering system for a vehicle, which enables steering to be easily carried out by changing a gear ratio using a planetary gear in the event of failure of a main steering device for a vehicle.

Description of Related Art

Referring to FIG. 1, a vehicle steering apparatus (especially, a commercial vehicle steering apparatus) includes a gear box 10 which is connected to a steering wheel 28 in a driver's seat, and a pitman arm 30 which is connected to the output shaft of the gear box 10 and is a type of output link. The pitman arm 30 is connected to a driving wheel hub through a drag link, a knuckle arm, etc.

When a decelerating force is output from the gear box 10 to the pitman arm 30 depending on the steering of the steering wheel 28, the pitman arm 30 rotates (angular rotation) clockwise or counterclockwise, in which case the driving wheel hub is steered right and left through the drag link and the knuckle arm by torque (rotational force), steering driving wheels.

When such a steering apparatus has failure, there is a need for an emergency steering device to urgently steer and move a vehicle to a safe place within a certain distance.

FIG. 2 illustrates a conventional emergency steering system, and reference numeral 10 denotes a gear box connected to a steering wheel.

The gear box 10 has a predetermined gear ratio for power steering, and power steering oil for power steering operation is circulated in the gear box 10.

A main steering device has a structure in which a main pump 14 is connected to an engine 12 to circulate the power steering oil.

Accordingly, the steering oil stored in a main oil tank 16 is supplied to the gear box 10 via a control valve 18 by the operation of the main pump 14 together with the engine 12, with the consequence that the gear box 10 is smoothly lubricated for the power steering operation thereof.

In the instant case, the power steering oil supplied to the gear box 10 is returned back to the main oil tank 16 through a check valve 20.

Meanwhile, when a steering force is lost due to the malfunction of the main pump, an emergency steering device is operated such that the steering wheel is operable, thereby enabling the vehicle to be moved in a desired direction.

The emergency steering device includes an electric motor 22, a sub-pump 24 connected to the electric motor 22, a sub-oil tank 26, etc.

When a steering force is lost due to the malfunction of the main pump, the sub-pump 24 is operated by the driving of the electric motor 22 so that the steering oil stored in the sub-oil tank 26 is supplied to the gear box 10 via the control valve 18. Consequently, the gear box 10 is smoothly lubricated for the power steering operation thereof, and the vehicle may be moved in a desired direction.

For reference, a controller determines that the emergency steering device is operated in an emergency state in which a steering force is lost when the vehicle speed is equal to or less than 1 km/h and the pumping flow rate by the main pump is equal to or less than 5 L/min.

However, although the conventional emergency steering system has an advantage of smoothly inducing a steering force using the electric motor and the sub-pump even when the engine is not driven, it may lead to an increase in manufacturing cost of vehicles since the motor pump unit including the electric motor and the sub-pump is very expensive. Particularly, the emergency steering system may not be operated because power is not supplied to the electric motor in the event of failure of batteries.

The information disclosed in this Background of the Invention section is only for enhancement of understanding of the general background of the invention and should not be taken as an acknowledgement or any form of suggestion that this information forms the related art already known to a person skilled in the art.

BRIEF SUMMARY

Various aspects of the present invention are directed to providing an emergency steering system for a vehicle, which enables temporary emergency steering to be easily carried out by mounting a planetary gear, having a structure in which a large sun gear and a small sun gear are disposed on the same axis, in an inlet portion of a gear box and by changing a gear ratio such that the planetary gear is ordinarily operated at a gear ratio of 1:1 and the gear ratio thereof is increased by separating the large sun gear in the event of failure of a main steering device.

In an exemplary embodiment, an emergency steering system for a vehicle includes a planetary gear mounted in an inlet space of a gear box for a steering apparatus so that the planetary gear is ordinarily operated at a gear ratio of 1:1 and has an increased gear ratio in the event of failure of a main steering device, and a gear ratio increasing device mounted to an upper plate portion of the gear box to increase the gear ratio of the planetary gear.

The planetary gear may include a small sun gear connected to a steering wheel, a plurality of first pinions engaged with the small sun gear, a large sun gear coaxially disposed behind the small sun gear, a plurality of second pinions engaged with the respective first pinions and the large sun gear, a ring gear inscribed and engaged with the second pinions, and a carrier connected to centers of rotation of the first and second pinions while being restrainedly connected to the large sun gear, the carrier being mounted to the upper plate portion of the gear box, and the large sun gear may be separated from the carrier by operation of the gear ratio increasing device when the main steering device has failure.

The carrier may include first shafts inserted through centers of the respective first pinions and through a body of the large sun gear, second shafts inserted through centers of the respective second pinions, connection links, each of which has one end portion connected to an associated one of the first shafts by a hinge and the other end portion connected to an associated one of the second shafts by a hinge, and a stationary link fixed to the upper plate portion of the gear box while the connection links interconnect.

The large sun gear may be maintained in a state in which the large sun gear is engaged with the second pinions even though the large sun gear is separated from the carrier.

The gear ratio increasing device may include a controller configured to detect failure of the main steering device, and an actuator mounted to the upper plate portion of the gear box so that a large sun gear of the planetary gear is pushed and separated from first shafts of a carrier in response to a command signal of the controller.

A pusher may be mounted to a piston of the actuator to be ordinarily maintained in a state in which the pusher is distanced from a front surface of a large sun gear and to push the large sun gear by moving forward together with the piston in the event of failure of the main steering device.

Other aspects and exemplary embodiments of the invention are discussed infra.

It is understood that the term "vehicle" or "vehicular" or other similar term as used herein is inclusive of motor vehicles in general including passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
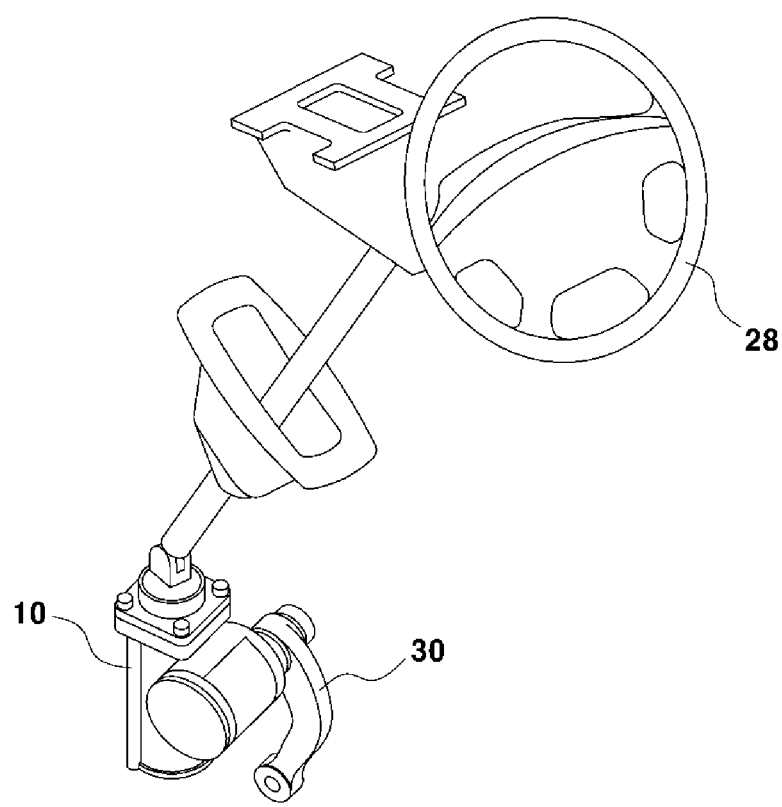
FIG. 1 is a view schematically illustrating a vehicle steering apparatus.
Figure 2:
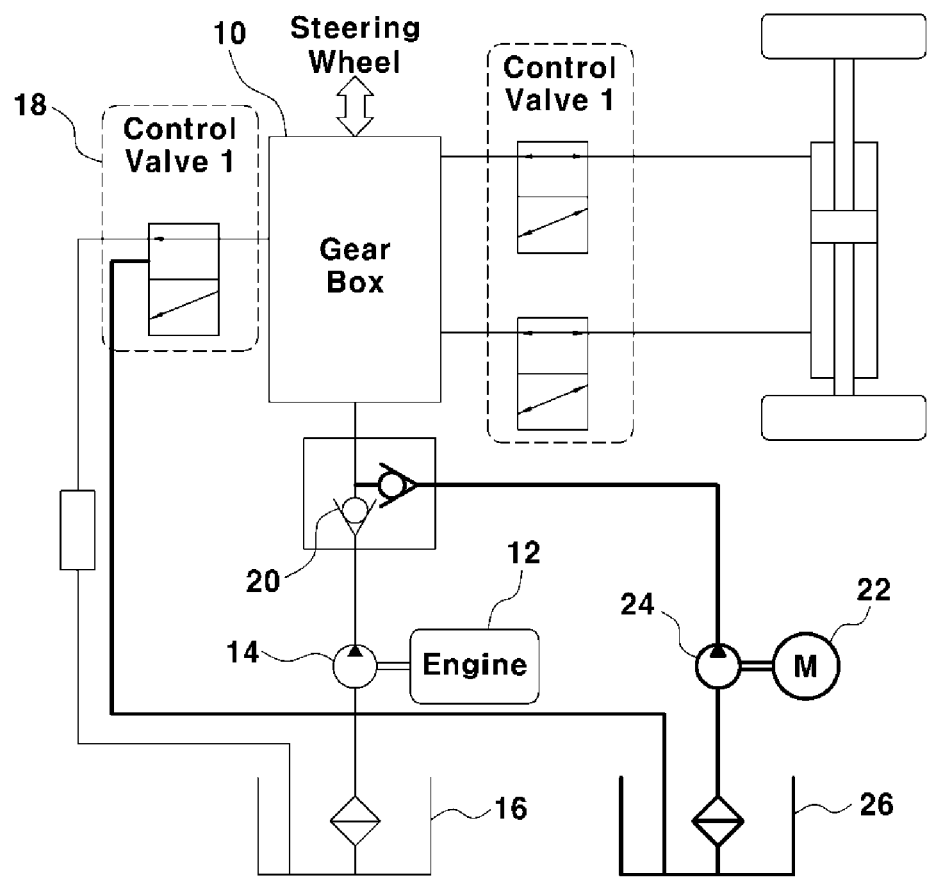
FIG. 2 is a circuit diagram illustrating a conventional emergency steering system.

It should be understood that the appended drawings are not necessarily to scale, presenting a somewhat simplified representation of various exemplary features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is intended to cover not only the exemplary embodiments, but also various alternatives, modifications, equivalents and other embodiments, which may be included within the spirit and scope of the invention as defined by the appended claims.

Figure 3:
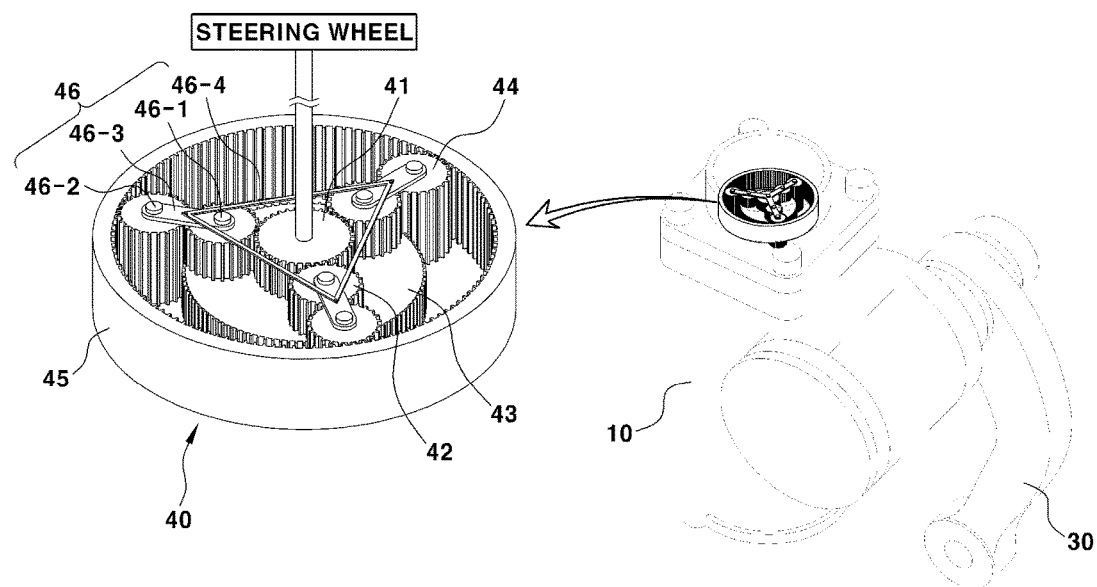
FIG. 3 is a perspective view illustrating an emergency steering system according to an exemplary embodiment of the present invention.

FIG. 3 is a perspective view illustrating an emergency steering system according to an exemplary embodiment of the present invention, and reference numeral 40 denotes a planetary gear.

The planetary gear 40 is mounted in the inlet space of a gear box 10, and has a structure in which the planetary gear 40 is ordinarily operated at a gear ratio of 1:1 and the gear ratio thereof is increased in the event of failure of a main steering device.

To this end, the planetary gear 40 includes a small sun gear 41 which is connected to a steering wheel and has a small diameter, a plurality of first pinions 42 which are circumscribed and engaged with the small sun gear 41, a large sun gear 43 which has a larger diameter than the small sun gear 41 and is coaxially disposed behind the small sun gear 41, a plurality of second pinions 44, each of which has an axial length longer than each of the first pinions 42, and which are circumscribed and engaged with the respective first pinions 42 and the large sun gear 43, and a ring gear 45 which is an internal gear inscribed and engaged with the second pinions 44.

The first pinions 42 and the large sun gear 43 are restrainedly interconnected by a carrier 46, and the second pinions 44 are also retrained by the carrier 46.

In other words, the carrier 46 is connected to the first and second pinions 42 and 44, and at the same time is restrainedly connected to the large sun gear 43 by a hinge.

To this end, the carrier 46 includes first shafts 46-1 which are inserted through the centers of the respective first pinions 42 and through the body of the large sun gear 43, second shafts 46-2 which are inserted through the centers of the respective second pinions 44, connection links 46-3, each of which has one end portion connected to an associated one of the first shafts 46-1 by a hinge and the other end portion connected to an associated one of the second shafts 46-2 by a hinge, and a tripod-shaped stationary link 46-4 which interconnects the connection links 46-3 and is fixed to the upper plate portion 100a of the gear box.

In the instant case, the large sun gear 43 is separated from the first shafts 46-1 of the carrier 46 by the operation of a gear ratio increasing device 50 when the main steering device has failure. To prevent the decoupling of the large sun gear 43 from the first shafts 46-1 even though the large sun gear 43 is separated therefrom, the large sun gear 43 is maintained in the state in which it is engaged with the second pinions 44.

The gear ratio increasing device 50 is a device which is mounted to the upper plate portion 100a of the gear box 10 to increase the gear ratio of the planetary gear 40 in the event of failure of the main steering device. The gear ratio increasing device 50 includes a controller 52 which detects the failure of the main steering device, and an actuator 54 which is mounted to the upper plate portion 100a of the gear box 10 and pushes the large sun gear 43 of the planetary gear 40 in response to the command signal of the controller 52 to separate the large sun gear 43 from the first shafts 46-1 of the carrier 46.

A separate pusher 58 is further mounted to a piston 56 of the actuator 54. Therefore, the pusher 58 is ordinarily maintained in the state in which it is distanced from the front surface of the large sun gear 43, and is configured to push the large sun gear 43 by moving forward along with the forward movement of the piston 56 in response to the command signal of the controller 52 in the event of failure of the main steering device.

Hereinafter, the operation flow of the emergency steering system having the above-mentioned structure according to the exemplary embodiment of the present invention will be described.

Ordinary State (Normal Operation of Main Steering Device)

Figure 4:
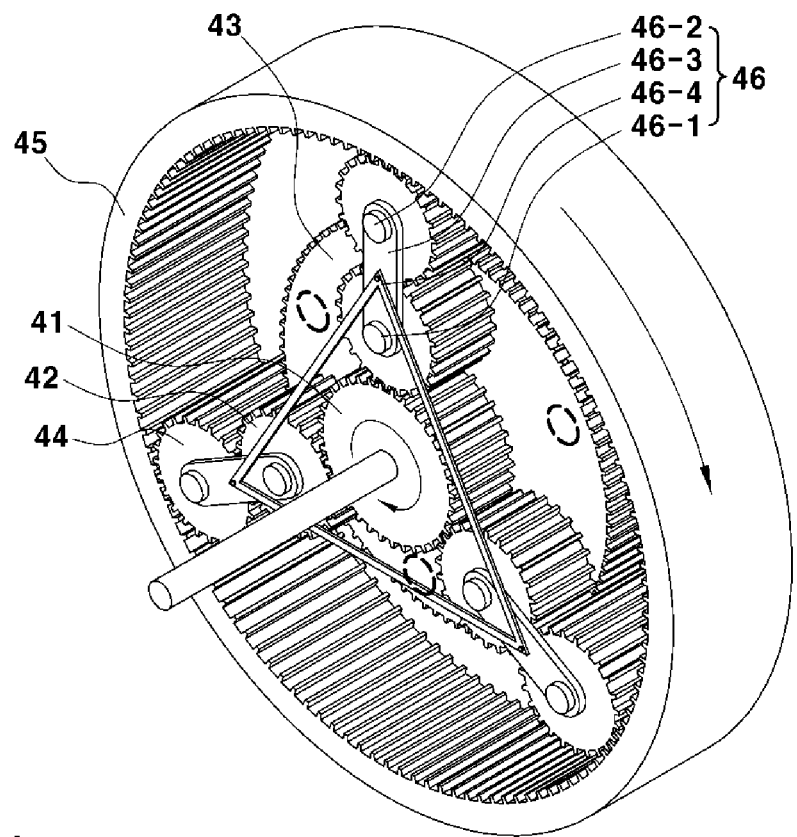
FIG. 4 is a perspective view illustrating a normal operation state of the emergency steering system according to the exemplary embodiment of the present invention.
Figure 6:
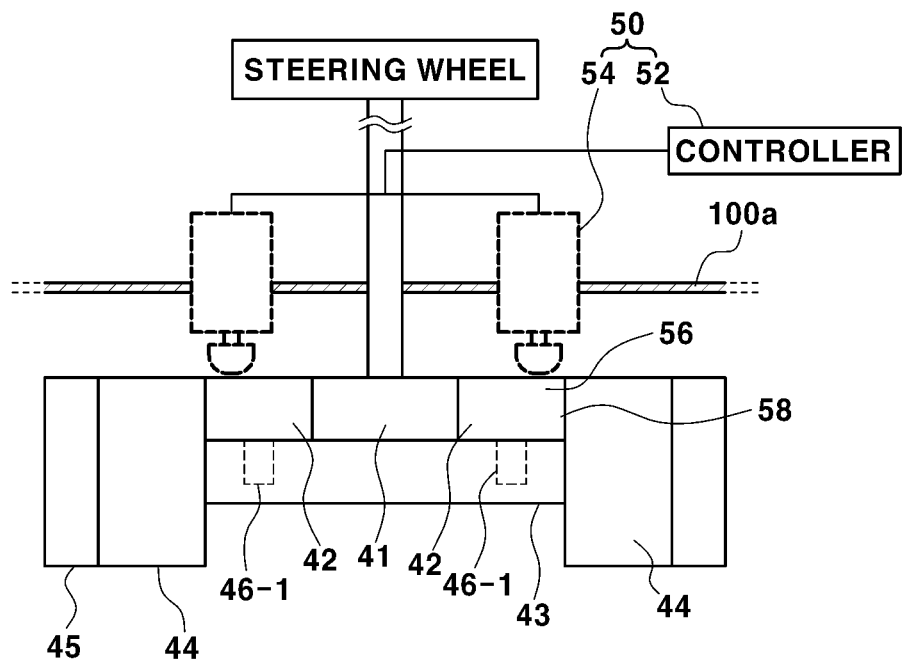
FIG. 6 and FIG. 7 are cross-sectional views before and after a gear ratio increasing device of the emergency steering system according to the exemplary embodiment of the present invention is operated.

FIGS. 4 and 6 are perspective and cross-sectional views illustrating the normal operation state of the emergency steering system according to the exemplary embodiment of the present invention.

When the main steering device, namely a main pump connected to an engine is normally operated, the planetary gear 40 is operated at a gear ratio of 1:1.

When the driver first turns the steering wheel in a forward direction, the small sun gear 41 is rotated forward by torque (rotational force).

In the instant case, the first pinions 42 engaged with the small sun gear 41 are reversely rotated by the forward rotation of the small sun gear 41, and then the second pinions 44 engaged with the first pinions 42 must rotate forward again. However, the second pinions 44 are not rotated since the large sun gear 43 engaged with the second pinions 44 is restrained so as not to move by the carrier 46.

In more detail, the first shafts 46-1 of the carrier 46 are inserted through the centers of the respective first pinions 42 and the body of the large sun gear 43, the second shafts 46-2 are inserted through the centers of the respective second pinions 44, the respective shafts 46-1 and 46-2 are interconnected by the connection links 46-3, and the connection links 46-3 are interconnected by the stationary link 46-4 fixed to the upper plate portion of the gear box 10. Therefore, the large sun gear 43 engaged with the second pinions 44 is restrained so as not to move by the first shafts 46-1 of the carrier 46.

When the large sun gear 43 is restrained by the carrier 46, the second pinions 44 engaged with the large sun gear 43 and the first pinions 42 engaged with the second pinions 44 are restrained together so as not to rotate.

Thus, even though the small sun gear 41 rotates in the forward or reverse direction, the first and second pinions 42 and 44 are not rotated.

Therefore, when the small sun gear 41 rotates depending on the operation of the steering wheel by the driver, torque during the rotation of the small sun gear 41 is directly transferred to the ring gear 45 through the first pinions 42, the large sun gear 43, and the second pinions 44, which are integrally restrained by the carrier 46.

Ultimately, the first pinions 42, the large sun gear 43, and the second pinions 44, which are integrally restrained by the carrier 46, and the ring gear 45 are simultaneously rotated by the torque of the small sun gear 41, so that the gear ratio of the small sun gear 41 as an input gear to the ring gear 45 as an output gear is 1:1.

Meanwhile, when the main steering device is normally operated, the gear ratio of the steering wheel to the output shaft (driving wheel) of the gear box is predetermined to be about 20.2:1, and the gear ratio of the small sun gear 41 as an input gear to the ring gear 45 as an output gear is 1:1. Therefore, a steering force may be smoothly transferred from the ring gear 45 to the input shaft in the gear box 10, based on the predetermined gear ratio of about 20.2:1, facilitating steering to be normally conducted.

Emergency State (Failure of Main Steering Device)

Figure 5:
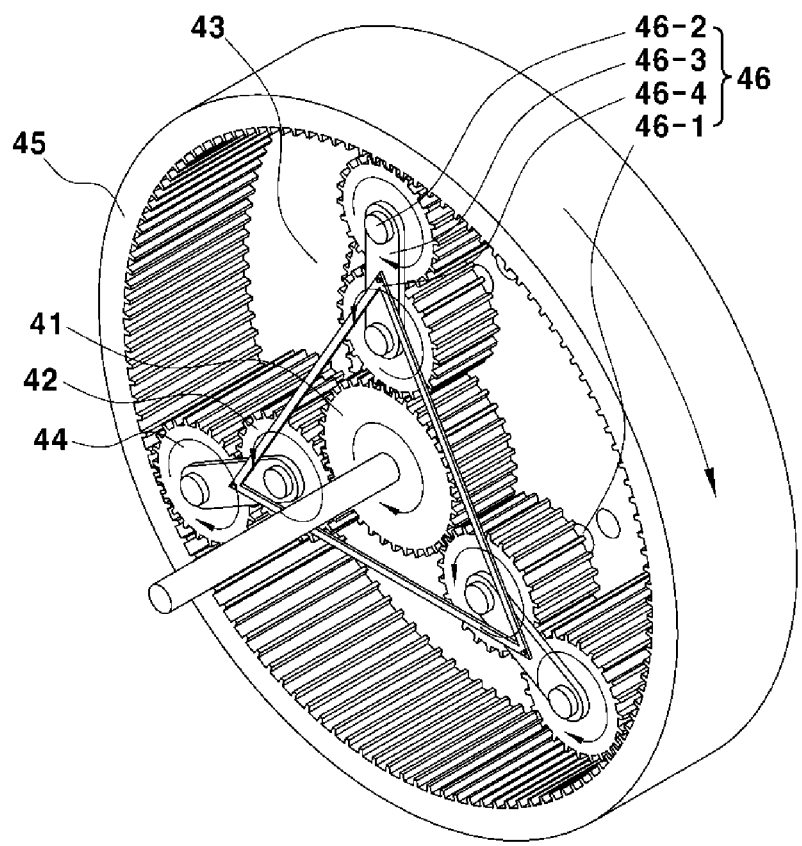
FIG. 5 is a perspective view illustrating an emergency operation state of the emergency steering system according to the exemplary embodiment of the present invention.
Figure 7:
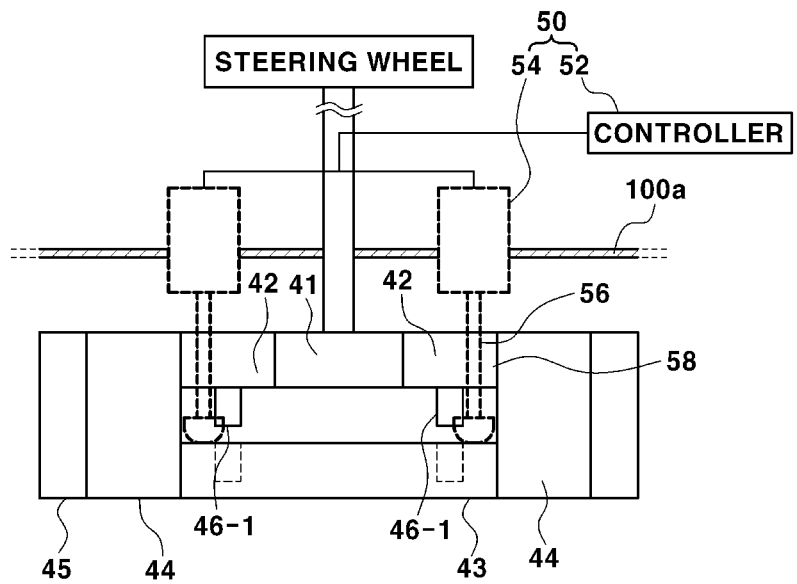

FIGS. 5 and 7 are perspective and cross-sectional views illustrating the emergency operation state of the emergency steering system according to the exemplary embodiment of the present invention.

When the main steering device, namely the main pump connected to the engine has failure, the planetary gear 40 is operated to have an increased gear ratio (e.g. 1.8:1), so that the vehicle may be moved in a desired direction while the emergency steering of the vehicle is smoothly conducted.

When the controller 52 detects the malfunction of the main pump (e.g. the case where the vehicle speed is equal to or less than 1 km/h and the pumping flow rate by the main pump is equal to or less than 5 L/min), the controller 52 transmits an operation signal to the actuator 54 mounted to the upper plate portion 100a of the gear box 10.

Thus, the piston 56 of the actuator 54 is moved forward, and is then moved backward after a certain time period.

In the instant case, when the piston 56 of the actuator 54 is moved forward, the pusher 58 attached to the piston 56 is pressed against the front surface of the body of the large sun gear 43 and pushes the large sun gear 43. Therefore, the large sun gear 43 is separated from the first shafts 46-1 of the carrier 46, and is then maintained in the state in which the large sun gear 43 is continuously engaged with the second pinions 44.

When the driver turns the steering wheel for steering in the forward direction after the large sun gear 43 is separated from the first shafts 46-1 of the carrier 46, the small sun gear 41 also rotates in the forward direction.

Subsequently, the first pinions 42 engaged with the small sun gear 41 are reversely rotated in place, and the second pinions 44 engaged with the first pinions 42 are rotated forward in place. Consequently, the ring gear 45 is rotated forward by the rotation of the second pinions 44.

In the instant case, the large sun gear 43 is separated from the first shafts 46-1 of the carrier 46. However, the first shafts 46-1 of the carrier 46 are inserted through the centers of the respective first pinions 42, the second shafts 46-2 are inserted through the centers of the respective second pinions 44, the respective shafts 46-1 and 46-2 are interconnected by the connection links 46-3, and the connection links 46-3 are interconnected by the stationary link 46-4 fixed to the upper plate portion 100a of the gear box 10. Therefore, the first and second pinions 42 and 44 are rotated in place by the torque transferred from the small sun gear 41 in the state in which they are fixed by the carrier.

When the steering wheel is turned by the driver, the torque from the sun gear 41 is sequentially transferred to the first pinions 42, the second pinions 44, and the ring gear 45. Therefore, the gear ratio of the sun gear 41 to the ring gear 45 is increased to be about 1.8:1.

Accordingly, the gear ratio of the steering wheel to the output shaft of the gear box is increased to be about 36.4:1 by multiplying the increased gear ratio of 1.8:1 and the gear ratio of 20.2:1 predetermined between the steering wheel and the output shaft (driving wheel) of the gear box, with the consequence that emergency steering may be easily conducted to move the vehicle to a desired position even though the main steering device has failure.

As is apparent from the above description, the present invention has the following effects.

Firstly, it is possible to easily carry out emergency steering by mounting a planetary gear in an inlet portion of a gear box for a steering apparatus and by changing a gear ratio such that the planetary gear is normally operated at a gear ratio of 1:1 and the gear ratio thereof is increased in the event of failure of a main steering device.

Secondly, it is possible to reduce vehicle manufacturing costs by mounting the planetary gear having a simple structure, compared to existing expensive motor pump units.

For convenience in explanation and accurate definition in the appended claims, the terms "upper", "lower", "internal", "outer", "up", "down", "upper", "lower", "upwards", "downwards", "front", "rear", "back", "inside", "outside", "inwardly", "outwardly", "internal", "external", "internal", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An emergency steering system for a vehicle, comprising:
   a planetary gear apparatus mounted in an inlet space of a gear box for a steering apparatus wherein the planetary gear apparatus is operated at a gear ratio of 1:1 in a condition of normal operation and has an increased gear ratio in an event of failure of a main steering device; and
   a gear ratio increasing device mounted to an upper plate portion of the gear box to increase the gear ratio of the planetary gear apparatus,
   wherein the planetary goy apparatus includes:
     a small sun gear connected to a steering wheel;
     a plurality of first pinions engaged with the small sun gear;
     a large sun gear coaxially disposed behind the small sun gear;
     a plurality of second pinions engaged with the respective first pinions and the large sun gear;
     a ring gear inscribed and engaged with the second pinions; and
     a carrier connected to rotation centers of the first and second pinions while being restrainedly connected to the large sun gear, the carrier being mounted to the upper plate portion of the gear box, and
   wherein the large sun gear is separated from the carrier by operation of the gear ratio increasing device in the event of failure of the main steering device.

2. The emergency steering system of claim 1, wherein the carrier includes first shafts inserted through the centers of the respective first pinions and through a body of the large sun gear, second shafts inserted through the centers of the respective second pinions, connection links, each of which has a first end portion connected to an associated one of the first shafts by a hinge and a second end portion connected to an associated one of the second shafts by a hinge, and a stationary link interconnecting the connection links.

3. The emergency steering system of claim 2, wherein the gear ratio increasing device includes:
   a controller configured to detect the event of failure of the main steering device; and
   an actuator mounted to the upper plate portion of the gear box wherein the large sun gear of the planetary gear apparatus is pushed and separated from the first shafts of the carrier in response to a command signal of the controller.

4. The emergency steering system of claim 1, wherein the large sun gear is maintained in a state in which the large sun gear is engaged with the second pinions even though the large sun gear is separated from the carrier.

5. The emergency steering system of claim 1, wherein the gear ratio increasing device includes:
   a controller configured to detect the event of failure of the main steering device; and
   an actuator mounted to the upper plate portion of the gear box wherein the large sun gear of the planetary gear apparatus is pushed and separated from first shafts of the carrier in response to a command signal of the controller.

6. The emergency steering system of claim 5, wherein a pusher is mounted to a piston of the actuator to be maintained in a state in which the pusher is distanced from a front surface of the large sun gear in the condition of normal operation and to push the large sun gear by moving forward together with the piston in the event of failure of the main steering device.

* * * * *